United States Patent Office 3,743,671
Patented July 3, 1973

3,743,671
CYCLOPENTANE COMPOUNDS HAVING ODORANT PROPERTIES AND PREPARATION THEREOF
Paul Jose Teisseire and Andre Marc Galfre, Grasse, France, assignors to S.A. des Etablissements Roure-Bertrand Fils & Justin Dupont, Grasse, France
No Drawing. Filed Oct. 27, 1970, Ser. No. 84,536
Claims priority, application Switzerland, Nov. 6, 1969, 16,649/69
Int. Cl. C07c 29/00, 35/02, 67/00, 69/14, 69/24, 69/74, 69/78
U.S. Cl. 260—488 R          8 Claims

ABSTRACT OF THE DISCLOSURE

Compounds of the formula

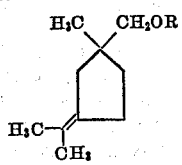

wherein R is hydrogen or lower acyl are useful odorants finding utility in perfume formulations.

---

This invention is concerned with novel cyclopentane compounds of the Formula I

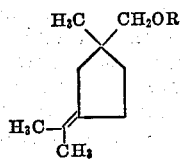     (I)

wherein R represents a hydrogen atom or the acyl residue of a fatty or aliphatic (including cycloaliphatic) or aromatic carboxylic acid containing from 1 to 8 carbon atoms; to a process for the manufacture thereof which comprises isomerizing a bicyclohexane compound of the Formula II

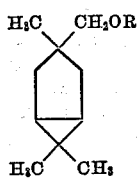     (II)

wherein R has the meaning given above, in the presence of an acid as an isomerizing agent; and, where R in Formula I represents hydrogen, saponifying an ester resulting from the isomerization to the corresponding alcohol; and to the utilization of the compounds of Formula I for perfumery purposes.

More specifically, in the above Formula I, where R is the acyl residue of a fatty or aliphatic (including cycloaliphatic) or aromatic carboxylic acid namely, an alkanoic acid containing from 1 to 8 carbon atoms, such acyl residues may, for example, be acetyl, propionyl, butyryl, valeryl, hexanoyl, pentanoyl, octanoyl, cyclohexanoyl and benzoyl. Especially preferred of said Formula I compounds, where R is an acyl residue as aforesaid, is that where R is acetyl.

The isomerization process of the invention, which involves the opening of the cyclopropane ring of the starting material II, is conveniently carried out at room temperature in the presence of an acid as an isomerizing agent. The isomerizing acid can be a mineral acid, such as hydrochloric acid, hydrobromic acid, sulphuric acid or phosphoric acid, or a strong organic acid, for instance trichloracetic acid or p-toluene sulfonic acid. Hydrochloric acid is preferred as the isomerizing agent.

The isomerization is conveniently effected in a solvent such as diisopropyl ether. Other solvents which may be used include other di(lower alkyl) ethers such as dimethyl ether or dibutyl ether, cyclic ethers, glycol ethers and polyglycol ethers and, also hydrocarbons such as benzene. Lower alkanols, of primary, secondary or tertiary character, can also be used as solvents, in particular where the starting material is an ester (i.e. for compounds of Formula II where R=acyl), illustrative of such alkanols being ethanol, propanol and isobutanol. Lower alkanol solvents are less suitable for the free hydroxymethyl compound (R of Formula II=H) because undesired by-products may be formed.

The course of the reaction (i.e. the extent of the isomerization equilibrium) may be followed by gas-chromatographic investigation of samples. The achievement of the equilibrium is to a certain extent dependent on the acid concentration in the reaction medium. Thus, when using about 8.4 ml. of concentrated hydrochloric acid per liter of reaction medium and working at room temperature, the reaction equilibrium is as a rule reached after about 1 day when one starts from the free alcohol (R of Formula II=H). When using an ester as the starting material (R of Formula II=acyl), for example, the acetate, the reaction equilibrium adjusts itself somewhat more slowly, for example in the course of about 6 days.

The crude isomerization product usually contains about 30–50% of the desired cyclopentane derivative of Formula I. When using the acetate as the starting material (R of Formula II=acetyl), the proportion of the desired cyclopentane derivative I is higher than when using the free alcohol (R of Formula II=H), since fewer by-products are formed.

The crude isomerization product may be isolated from the reaction medium using conventional methods, for example by neutralization and washing of the reaction solution, removal of the solvent by distillation and, if desired, rectification of the distillation residue.

The starting materials of Formula II can be obtained from 3-carene according to the following reaction scheme:

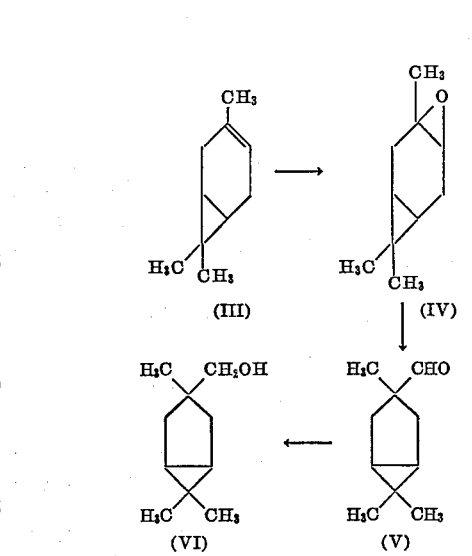

By way of explanation of this reaction scheme, 3-carene is oxidized with a peracid (e.g. monoperphthalic acid) to yield α-epoxycarane (IV), this is then isomerized by heterogeneous catalysis to give 3-formyl-3,6,6-trimethylbicyclo[3.1.0] - hexane (V), which may then be reduced to the corresponding 3-hydroxymethyl Compound VI, for example by means of diisobutyl aluminium hydride.

The 3-hydroxymethyl Compound VI may be esterified according to esterification techniques which are known per se. Thus, for example, the corresponding acetate (R of Formula II=acetyl) can be obtained by acetylation with an acetic anhydride-pyridine mixture.

The esters of the present invention (compounds of Formula I where R=acyl) can be saponified to the corresponding free alcohols (compounds of Formula I where R=H) by saponification techniques which are known per se.

The alcohol of the invention, 1-hydroxymethyl-1-methyl-3-isopropylidene-cyclopentane (compound of Formula I where R=H), is distinguished by a characteristic odor of lily-of-the-valley and lilac and can accordingly be used as an odorant for perfumery purposes, for example for the manufacture of odorant compositions such as perfumes or for perfuming various cosmetic products, such as soaps, powders, salves, and creams including face creams, shave creams, and the like. For these purposes the said alcohol can, if desired, be mixed with solvents and diluents which are conventionally used in the odorant industry, further odorants and, also, with stabilizers and fixatives. 1-hydroxymethyl-1-methyl-3-isopropylidene-cyclopentane, for instance, and other odorants made pursuant to the present invention, may conveniently be used in odorant compositions in an amount of from 0.5 to 50% by weight.

The esters of the invention (compounds of Formula I where R=acyl) can likewise be used as odorants, or as intermediates for the production of the free alcohol (compound of Formula I where R=H).

In the following examples, all temperatures are in degrees centigrade.

EXAMPLE 1

(a) 20 g. of 3-hydroxymethyl-3,6,6-trimethyl-bicyclo-[3.1.0]-hexane are dissolved in 600 ml. of diisopropyl ether containing 5 ml. of concentrated hydrochloric acid. The solution is allowed to stand at room temperature for 24 hours. The solution is worked up by washing with water, then with 5% aqueous sodium bicarbonate and again with water. The diisopropyl ether solvent is then distilled off and the residue is distilled under reduced pressure. There is thus obtained 19.5 g. of crude product which is shown, by gas-chromatographic analysis, to contain about 30% by weight of 1-hydroxymethyl-1-methyl-3-isopropylidene-cyclopentane.

After purification by means of preparative gas chromatography, there is obtained 5.1 g. of pure 1-hydroxymethyl-1-methyl-3-isopropylidene-cyclopentane, smelling of lily-of-the-valley and lilac, and having the following IR and NMR spectrum:

IR spectrum: main bands at 3361, 1644, 1374, 1035 cm.$^{-1}$
NMR spectrum:
 3H(CH$_3$) singlet at 0.96 p.p.m.
 6H quadruplet at 1.58 p.p.m. (=1.6 hertz)
 2H singlet at 3.32 p.p.m.

The 3-hydroxymethyl - 3,6,6 - trimethyl-bicyclo[3.1.0] hexane used as the starting material may be prepared as follows:

(b) 245 g. (1.8 mol) of 3-carene are added over one hour to 4600 ml. of a 0.58 N ethereal solution of monoperphthalic acid at 0°. The reaction mixture is allowed to stand for 24 hours, during which time the temperature rises to about 20°. The reaction mixture is worked up by washing with water, then with 5% aqueous sodium bicarbonate and again with water. The product is then dried over anhydrous sodium sulfate and the solvent is evaporated off. There is obtained 180 g. of α-epoxy-carane having a boiling point of 65°/5 mm.; $n_D^{20}$=1.4644, $α_D^{20}$=13.4.

(c) 20 g. (0.13 mol) of α-epoxy-carane are conducted in the vapour state through a glass tube of 20 mm. diameter and 50 mm. long filled with Celite (0.2–0.3 mm. particle size) and heated externally to 180°–190°. There is obtained 19 g. of crude product from which, after rectification, 17 g. of 3-formyl-3,6,6-trimethyl-bicyclo[3.1.0]-hexane is isolated. Boiling point 55°/5 mm.; $n_D^{20}$=1.4611; $α_D^{20}$=0; melting point of the semicarbazone: 194°.

(d) 37.5 g. (0.25 mol) of 3-formyl-3,6,6-trimethyl-bicyclo[3.1.0]-hexane are dissolved in 400 ml. of petroleum ether. This solution is added over 2 hours to a solution of 70 ml. (0.38 mol) of diisobutyl aluminium hydride in 800 ml. of petroleum ether. The mixture is then refluxed for 2 hours. The reaction product is worked up by pouring it into cold dilute sulfuric acid. The organic layer is then washed with water, then with 5% aqueous sodium bicarbonate and again with water. The product is then dried over anhydrous sodium sulfate and the solvent evaporated off. 37 g. of crude product are obtained from which ca. 30 g. of 3-hydroxymethyl-3,6,6-trimethyl-bicyclo[3.1.0]-hexane of boiling point 56°/2.5 mm.; melting point 31–32° are isolated by rectification.

This alcohol may be quantitatively esterified to the corresponding acetate with a mixture of acetic anhydride and pyridine.

EXAMPLE 2

11 g. of 3-acetoxymethyl-3,6,6-trimethyl-bicyclo[3.1.0]-hexane were isomerized using the method described in Example 1 to give 1-acetoxymethyl-1-methyl-3-isopropylidene-cyclopentane. The reaction reached a state of equilibrium at room temperature after 6 days. Extraction of the crude mixture yielded 10 g. of a crude product which contained about 50% of 1-acetoxymethyl-1-methyl-3-isopropylidene-cyclopentane.

By saponification of the acetate obtained, by refluxing with a 10% w./w. ethanolic solution of potassium hydroxide, neutralization, distillation off of most of the ethanol, taking up the residue with water, extracting with petroleum ether, and then working up according to the procedure given in Example 1, there was obtained the alcohol (1 - hydroxymethyl-1-methyl-3-isopropylidene-cyclopentane) described in Example 1.

The 3 - acetoxymethyl-3,6,6-trimethyl-bicyclo[3.1.0]-hexane used as starting material may be obtained by acetylation of the corresponding alcohol (3-hydroxymethyl-3,6,6-trimethyl-bicyclo[3.1.0]-hexane) by acetic anhydride/pyridine.

EXAMPLE 3

An odorant composition having a lilac note containing 1 - hydroxymethyl - 1 - methyl - 3 - isopropylidene - cyclopentane is prepared according to the following recipe:

| | Parts by weight |
|---|---|
| Terpineol extra | 90 |
| Cinnamyl alcohol | 80 |
| Phenylethyl alcohol | 310 |
| Anisaldehyde | 30 |
| Linalool | 20 |
| Linalyl acetate | 10 |
| Benzyl acetate | 20 |
| Ylang-ylang oil 2nd fraction | 10 |
| Styrax-oil rectified; 10% solution in ethyl phthalate | 30 |
| Phenylpropyl alcohol | 30 |
| Cyclamen alcohol | 10 |
| Hydroxy-citronellal | 100 |
| 1-hydroxymethyl-1-methyl-3-isopropylidene - cyclopentane | 260 |
| | 1000 |

We claim:
1. A process for the preparation of compounds of the formula

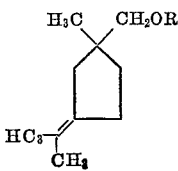

(I)

wherein R represents a member selected from the group consisting of a hydrogen atom and the acyl residue of an alkanoic acid containing from 1 to 8 carbon atoms, cyclohexanoic acid and benzoic acid, which comprises isomerizing a compound of the formula

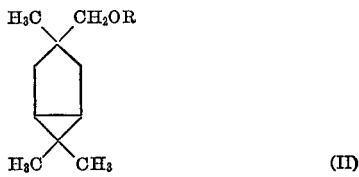

(II)

wherein R has the meaning given above, in the presence of an acid selected from the group consisting of mineral acids and strong organic acids as an isomerizing agent.

2. A process as claimed in claim 1, wherein the acid is hydrochloric acid.

3. A process as claimed in claim 1, wherein R in Formula II is acetyl.

4. A process as claimed in claim 1, wherein R in Formula II is hydrogen.

5. A process as claimed in claim 1, wherein R represents hydrogen in Formula I, wherein an ester of Formula I, resulting from the isomerization, is saponified to the corresponding alcohol.

6. Compounds of the formula

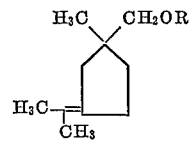

wherein R represents a member selected from the group consisting of a hydrogen atom and the acyl residue of an alkanoic acid containing from 1 to 8 carbon atoms, cyclohexanoic acid and benzoic acid.

7. A compound as claimed in claim 6, in which R is hydrogen.

8. A compound as claimed in claim 6, in which R is acetyl.

References Cited

Chem. Abstracts, 57:13634L (1962).

VIVIAN GARNER, Primary Examiner

U.S. Cl. X.R.

252—522; 260—348.5 L, 410, 468 R, 476 R, 491, 598, 617 F, 617 R